US010579694B1

(12) United States Patent
Jenkins et al.

(10) Patent No.: US 10,579,694 B1
(45) Date of Patent: Mar. 3, 2020

(54) LOCATION BASED RECOMMENDATION AND TAGGING OF MEDIA CONTENT ITEMS

(71) Applicant: Amazon Technologies, Inc., Reno, NV (US)

(72) Inventors: Jonathan A. Jenkins, Seattle, WA (US); John Rauser, Seattle, WA (US); William Alexander Strand, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 296 days.

(21) Appl. No.: 15/414,174

(22) Filed: Jan. 24, 2017

Related U.S. Application Data

(63) Continuation of application No. 12/787,038, filed on May 25, 2010, now Pat. No. 9,569,549.

(51) Int. Cl.
*G06F 16/9537* (2019.01)
*G06Q 30/06* (2012.01)

(52) U.S. Cl.
CPC ..... *G06F 16/9537* (2019.01); *G06Q 30/0645* (2013.01)

(58) Field of Classification Search
None
See application file for complete search history.

(56) References Cited

U.S. PATENT DOCUMENTS

| | | | |
|---|---|---|---|
| 5,956,740 A | 9/1999 | Nosohara | |
| 7,428,534 B2 | 9/2008 | Ito et al. | |
| 8,060,525 B2 | 11/2011 | Svendsen et al. | |
| 8,060,582 B2 | 11/2011 | Bliss et al. | |
| 8,140,570 B2 | 3/2012 | Ingrassia et al. | |
| 8,140,621 B2 | 3/2012 | Vance et al. | |
| 9,378,515 B1 * | 6/2016 | Hassett | H04W 4/023 |
| 2003/0033214 A1 | 2/2003 | Mikkelsen et al. | |
| 2003/0164796 A1 | 9/2003 | Needham | |
| 2007/0005419 A1 | 1/2007 | Horvitz et al. | |
| 2008/0147505 A1 | 6/2008 | Davis | |
| 2008/0163039 A1 | 7/2008 | Ryan et al. | |
| 2008/0168073 A1 | 7/2008 | Siegel et al. | |
| 2008/0222156 A1 | 9/2008 | Ryan et al. | |

(Continued)

OTHER PUBLICATIONS

Anonymous, Google I/O 2013 Keynote Transcript, Jun. 2014. Retrieved from Internet: https://singjupost.com/google-io-2013-keynote-transcript/?singlepage=1.*

(Continued)

*Primary Examiner* — James Trujillo
*Assistant Examiner* — Cheryl M Shechtman
(74) *Attorney, Agent, or Firm* — Lee & Hayes, P.C.

(57) ABSTRACT

Content items, such as e-books, audio files, video files, and the like, may be tagged as associated with a location based on observing the locations at which users access the content items. A rich set of tag data may be gathered by additionally observing such things as the date and time when users access the content items as well as allowing the users to tag the content items with comments or ratings. A fine granularity of tagging may be achieved by associating the tags with specific portions of the content items. Content recommendations based on the tags may be provided to other users when those users are in approximately the same location.

20 Claims, 10 Drawing Sheets

(56) References Cited

U.S. PATENT DOCUMENTS

| | | |
|---|---|---|
| 2008/0250080 A1 | 10/2008 | Arrasvuori et al. |
| 2009/0113532 A1 | 4/2009 | Lapidous |
| 2009/0119168 A1* | 5/2009 | Otto .................. G06Q 10/087 |
| | | 705/14.26 |
| 2009/0327889 A1 | 12/2009 | Jeong et al. |
| 2010/0063877 A1 | 3/2010 | Soroca et al. |
| 2010/0130125 A1 | 5/2010 | Nurmi |
| 2010/0192172 A1 | 7/2010 | Thomas et al. |
| 2010/0216491 A1 | 8/2010 | Winkler et al. |
| 2011/0099180 A1 | 4/2011 | Arrasvuori |
| 2011/0238690 A1 | 9/2011 | Arrasvuori et al. |

OTHER PUBLICATIONS

Youtube video entitled "Google I/O 2013: Keynote", uploaded on May 15, 2013 by user "Google Developers", Retrieved from Internet: <https://www.youtube.com/watch?v=9pmPa_KxsAM> (Year: 2013).*

Office action for U.S. Appl. No. 12/787,038 dated Oct. 5, 2015, Jenkins et al., "Location Based Recommendation and Tagging of Media Content Items", 34 pages.

Office action for U.S. Appl. No. 12/787,038, dated Nov. 30, 2012, Jenkins et al., "Location Based Recommendation and Tagging of Media Content Items", 22pages.

Final Office Action for U.S. Appl. No. 12/787,038, dated Dec. 24, 2014, Jonathan A. Jenkins, "Location Based Recommendation and Tagging of Media Content Items", 34 pages.

Office action for U.S. Appl. No. 12/787,038, dated May 19, 2016, Jenkins et al., "Location Based Recommendation and Tagging of Media Content Items", 30 pages.

Office Action for U.S. Appl. No. 12/787,038, dated May 22, 2014, Jonathan A. Jenkins, "Location Based Recommendation and Tagging of Media Content Items", 29 pages.

Office action for U.S. Appl. No. 12/787,038, dated Sep. 11, 2013, Jenkins et al., "Location Based Recommendation and Tagging of Media Content Items", 30 pages.

* cited by examiner

LOCATION BASED RECOMMENDATION AND TAGGING OF MEDIA CONTENT ITEMS

CROSS REFERENCE TO RELATED APPLICATION

This application is a continuation of, and claims priority to, co-pending commonly owned U.S. patent application Ser. No. 12/787,038, entitled, "Location Based Recommendation and Tagging of Media Content Items," and filed on May 25, 2010, of which the entire contents are incorporated herein by reference.

BACKGROUND

A large and growing population of users is consuming increasing amounts of digital content items, such as music, movies, audio books, images, electronic books, executables, and so on. These users employ various electronic access devices to consume such content items. Among these access devices are electronic book readers, cellular telephones, personal digital assistant (PDA), portable media players, tablet computers, netbooks, and the like. As more users consume media content items electronically, new opportunities to observe how users interact with content may be discovered and explored.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
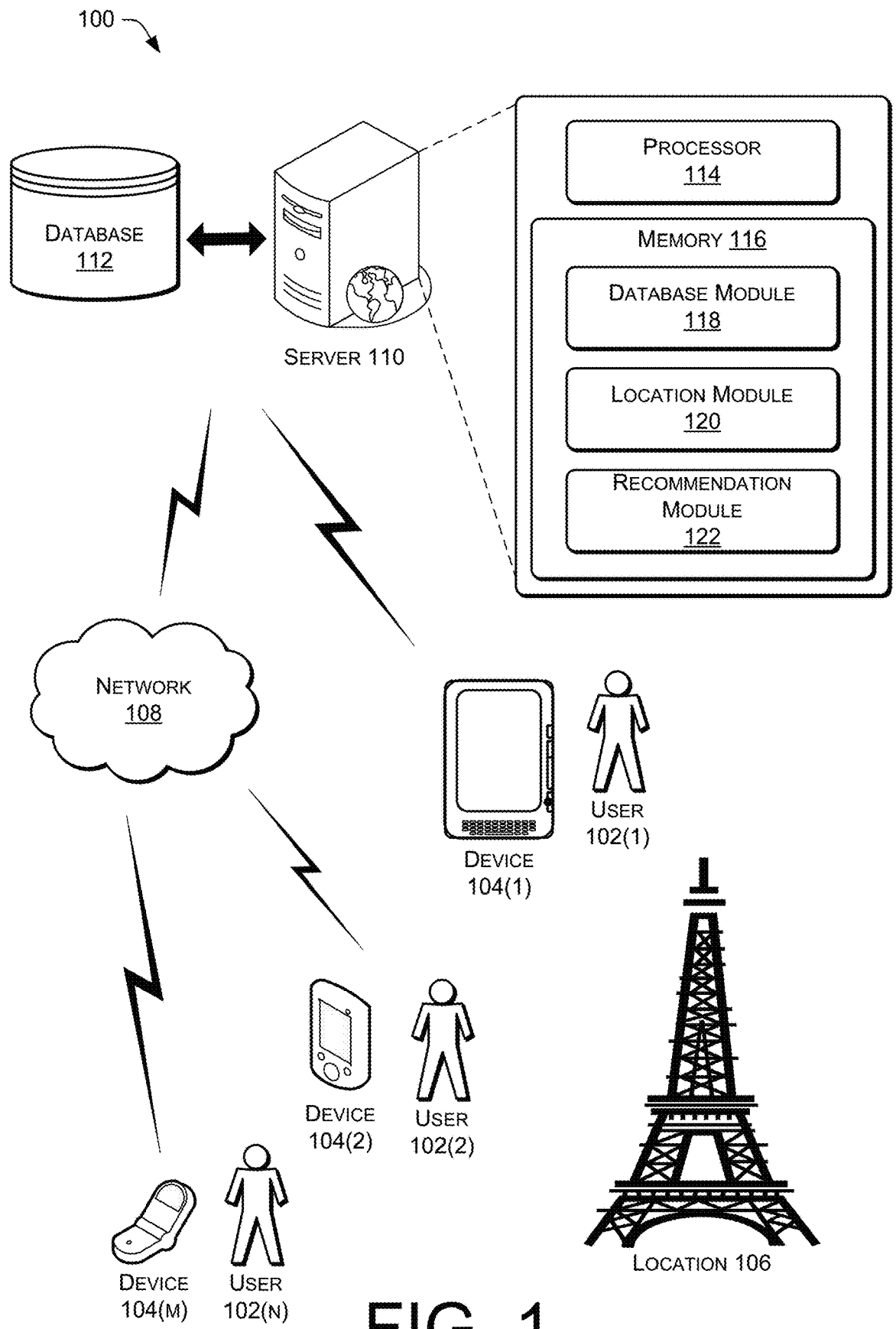
FIG. 1 is an illustrative architecture for tagging content items based on location. The architecture includes many electronic access devices that can be used to access content items as well as a server and a database that correlate tags with portions of the content items, such as the location where a content item is accessed.

This disclosure describes an architecture and techniques in which user interaction with content items, including the location of interaction with those content items, is aggregated and analyzed. A content item may be essentially any form of an electronic media data that may be consumed on an electronic access device, such as digital books, electronic magazines, music, movies, and so on. A content item may also be composed of multiple smaller portions, such as paragraphs, pages, chapters, sections, tracks, songs, episodes, frames, scenes, intervals, and so forth.

Users may access and consume the content items through a wide variety of electronic access devices, such as electronic book readers, cellular telephones, personal digital assistant (PDA), portable media players, tablet computers, and so forth. With the help of these devices and with user authorization, tags identifying where and when users interact with portions of individual content items may be associated with the portions of the content items and then collected, aggregated, and reported. Metrics derived from the tags may include access statistics, such as which content items were accessed at a particular location.

These metrics provide insights into what content items, or portions thereof, were accessed at a given location. These insights may be exposed to users by providing recommendations based on the access behavior of other users. For instance, travel guidebooks and/or restaurant reviews may be recommended to a user of a content access device based on the user's current location. A user accessing a device near the Eiffel Tower may receive recommendations for specific pages of travel guidebooks based on which pages of the travel guidebooks are tagged as being associated with the Eiffel Tower.

Association of tags with specific portions of content items may increase the value a user derives from the content items by presenting only relevant content items. For example, content items related to a café near the Eiffel Tower may be removed from a list of recommended content items if the user is accessing his or her device at a time of day when the café is closed. The user, or a computing device, may apply other filters such as showing only content items accessed by similar users in the same location. For instance, a user interested more in technology and engineering than plants and gardening may see recommendations based on tags placed by other users with similar interests. Users may also place their own tags on to portions of content items. For example, a user may comment that a portion of a guidebook is outdated because the hotel it describes is no longer in business. Similarly, a user may rate a portion of the content item.

For discussion purposes, the architecture and techniques are described in a network context where the content items and tags are retrieved from remote servers and/or databases. However, the concepts described herein are also applicable in other architectures such as an off-line environment where content item and tag information is contained within the electronic access device or an ad-hoc network formed by multiple electronic access devices interacting as peers without a central server or database.

Data Collection, Tagging, and Recommendation Architecture

FIG. 1 shows an illustrative architecture 100 for tracking when, where, and how users access content items. Users 102(1), 102(2), . . . , 102(N) are part of a community of users. In this disclosure, letters such as N and M are any integer number greater than zero. The users may consume a wide variety of content items, such as books, magazines, music, movies, and so on.

Each representative user 102(1)-(N) employs one or more corresponding electronic access devices 104(1), 104(2), . . . , 104(M) ("devices") to enable consumption of the content items. For instance, user 102(1) uses an electronic book ("eBook") reader device 104(1) to read digital textual material, such as electronic books, magazines, and the like. User 102(2) is using a PDA 104(2) to access content items. User 102(N) employs a mobile phone 104(M) to enjoy any number of content items, such as listening to audio, or reading electronic textual material. While these example devices are shown for purposes of illustration and discussion, it is noted that many other electronic devices may be used, such as laptop computers, portable media players, tablet computers, netbooks, gaming consoles, DVD players, media centers, and the like.

The users 102(1)-(N) and devices 104(1)-(M) may share a location 106. Each of the devices 104(1)-104(M) may be equipped with a GPS receiver to access the global positioning system (GPS) and determine a location 106. Determination of a location 106 may also be achieved through different mechanisms including, but not limited, to manual designation of the location 106 by the user 102. In this example, the users' access devices 104(1)-104(M) are not all in the exact same place, but are all located near the Eiffel Tower in Paris, France. Multiple devices 104(1)-104(M) may be designated as sharing a same location 106 if the devices are within a threshold distance of each other or of a landmark (e.g., all devices within 100 meters of the Eiffel Tower are at the same location 106).

Some of the devices 104(2) and 104(M) may be connected to a network 108. The network 108 may be any type of communication network, including the Internet, a local area network, a wide area network, a wireless wide area network (WWAN), a cable television network, a wireless network, a telephone network, and so forth. The network 108 may provide a connection to a server 110 and a database 112. Other of the devices 104(1) may communicate with the server 110 and the database 112 without a connection to the network 108. The server 110 may be implemented in any number of ways, including as a single server, a cluster of servers, a server farm or data center, other server architectures (e.g., mainframe), and the like. Of particular note, the devices 104 may be equipped with a wireless communication functionality that allows wireless communication with the network 108, server 110, and/or database 112.

The devices 104 may be configured with functionality to download content items from remote sources, such as the server 110 and/or the database 112. The devices 104 may also access content items stored locally in a memory of the device 104. Information pertaining to the download and/or access of content items and the corresponding electronic access device 104 may be transferred to the server 110 if a user 102 explicitly authorizes the sharing of such information.

The server 110 may store or otherwise have access to content items that can be presented on the electronic access devices 104(1)-(M). In some implementations the database 112 may be a data store within the server 110. In other implementations the database 112 may be separate from the server 110.

The server 110 includes a one or more processors 114 configured to execute instructions and access data stored in a memory 116. The memory 116 implements a computer-readable storage media that may include, for example, random access memory (RAM), read-only memory (ROM), electrically erasable programmable read-only memory (EE-PROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other non-transitory medium which can be used to store the desired information and which can be accessed by the one or more processors 114.

Figure 5:
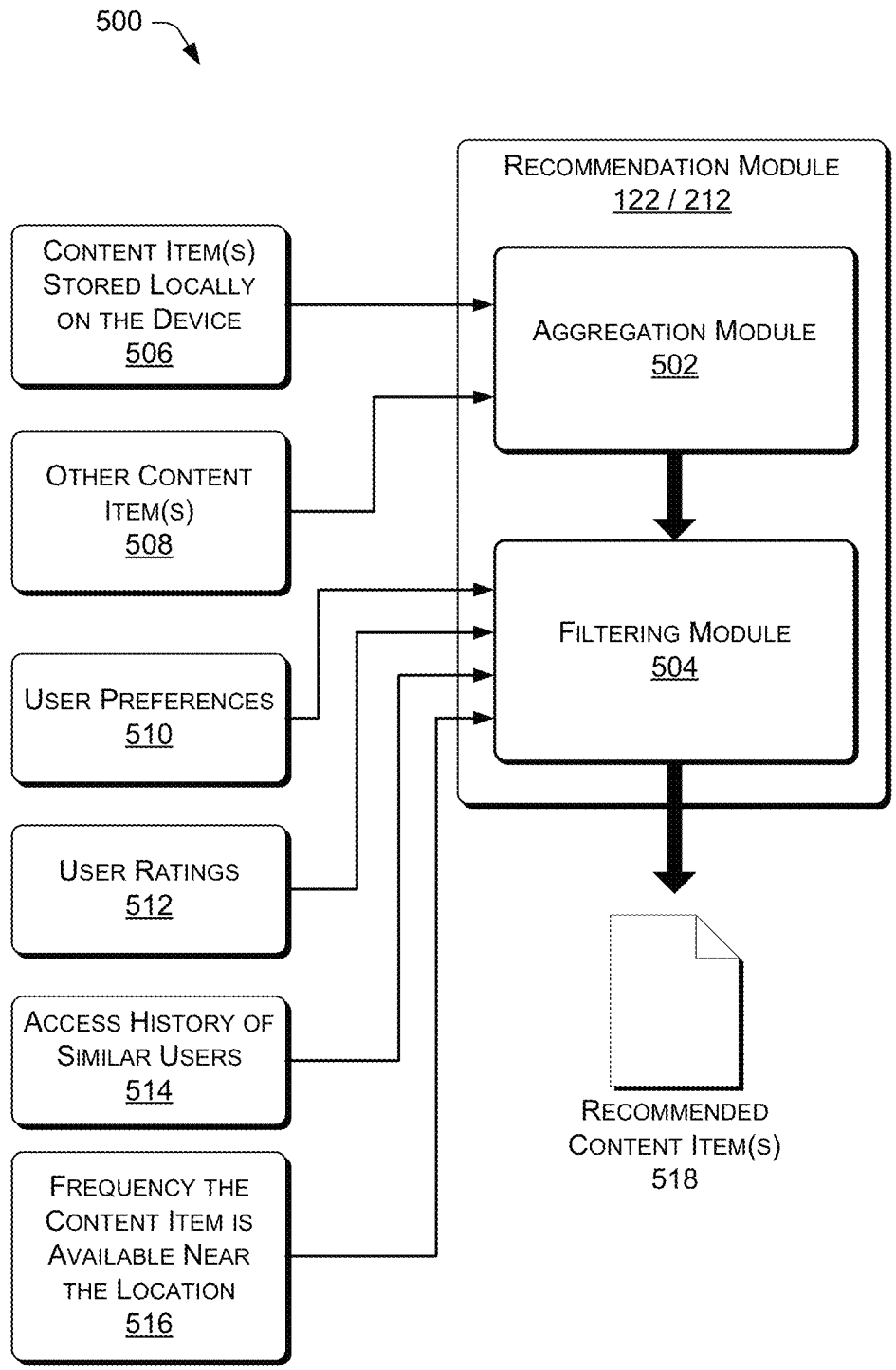
FIG. 5 shows an illustrative recommendation module of FIGS. 1 and/or 2, and possible content items that may be recommended.

The memory 116 may include a database module 118, a location module 120, a recommendation module 122, as well as potentially other modules or information. The database module 118 may be configured to access the database 112 which stores tags associated with portions of content items as will be discussed in greater detail below in FIG. 3. The location module 120 may be configured to receive an indication of a location 106 of an electronic access device 104 (e.g., as determined by GPS). The recommendation module 122 may be configured to recommend a content item or a portion of a content item. The content item may be selected from the content items stored in the database 112 and/or the content items stored locally on the device 104. The recommendation provided by the recommendation module 122 may be based on the location of the device 104 and a tag associated with the content item. The recommendation module 122 may aggregate content items and subsequently filter the content items in order to generate a recommendation as will be discussed in greater detail below with regards to FIG. 5.

For instance, user 102(2) may be accessing page 130 of a guidebook in English while viewing the Eiffel Tower. Another user 102(N), also a tourist, may be accessing page 50 of another guidebook while standing on a platform of the Eiffel Tower. However, this other guidebook is written in German. The server 110 may receive both an indication of what book and which pages within the book these two tourists 102(2) and 102(N) are accessing while at or near the location 106 of the Eiffel Tower. As a result of this usage pattern, the two content items (i.e., the English guidebook and the German guidebook) may be tagged with the location of the Eiffel Tower. Subsequently, when the user 102(1) accessing the electronic book reader device 104(1) is also near the Eiffel Tower and wants to find a good guidebook, the server 110 (e.g., specifically the recommendation module 122) may recognize that page 130 of the English language guidebook and page 50 of the German language guidebook are potentially relevant to the current location 106 of the electronic book reader device 104(1). If the user 102(1) has indicated, such as through user preferences or the like, that he or she wishes to receive content items only in English, the server 110 may filter out the German language guidebook and recommend the English language guidebook, specifically page 130 of that guidebook, to the user 102(1).

While this particular example is given in the context of textual material related to the Eiffel Tower, it is noted that the example is merely illustrative. Rather, as noted above, consumption or purchase of various types of other content items, such as videos or music, may be supported by the same architecture at any number of locations and for any number of users.

Illustrative Electronic Access Device

Figure 2:
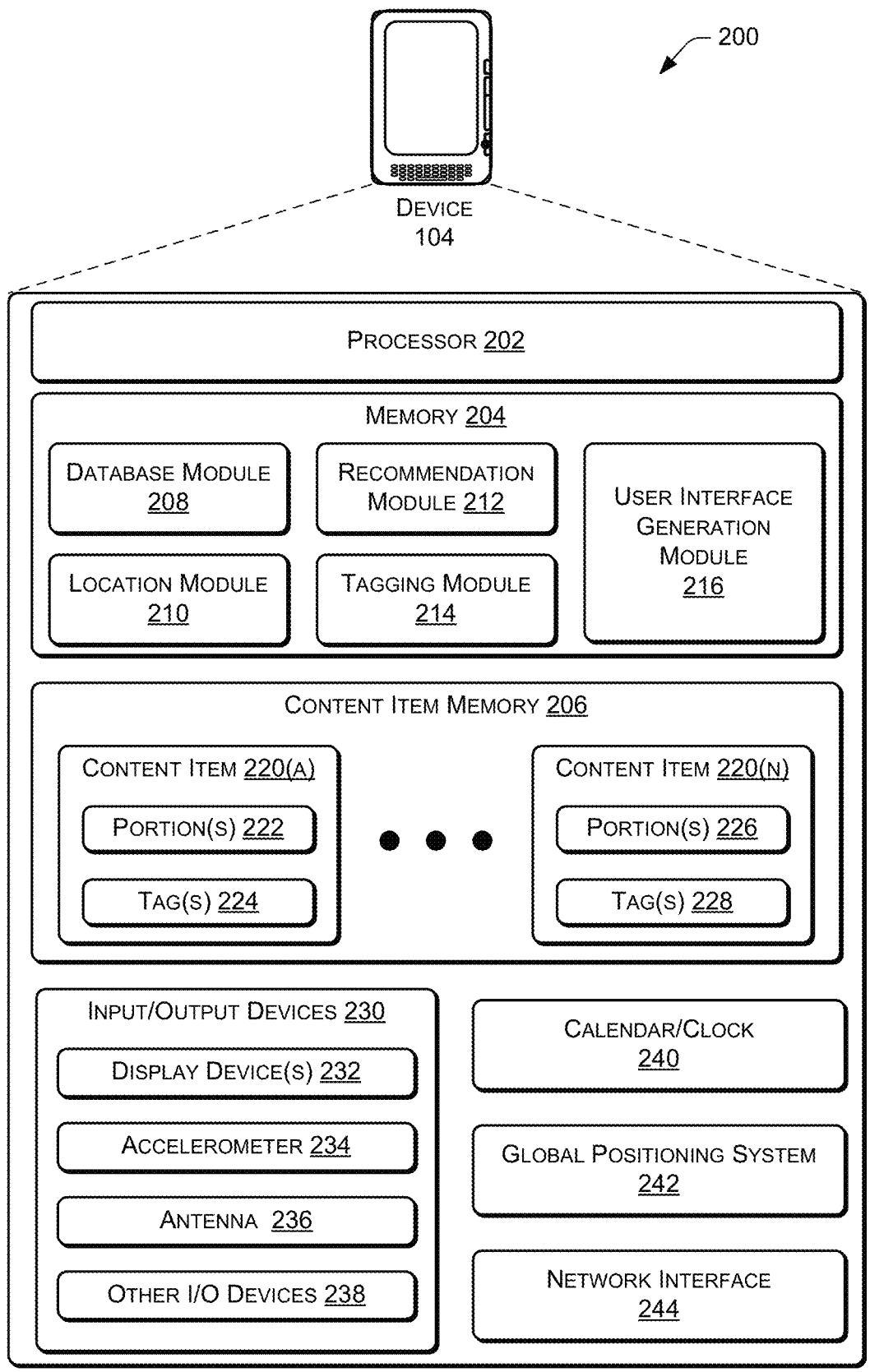
FIG. 2 is a block diagram illustrating selected modules in one of the devices of FIG. 1 that retrieves and presents the content items.

FIG. 2 shows a block diagram of illustrative components that may be included in one of the electronic access devices 104 from FIG. 1. The device 104 includes one or more processors 202 configured to execute instructions and access data stored in memory 204. The device 104 may also include content item memory 206 for storing local copies of content items. In some implementations, the content item memory 206 may be a portion of the memory 204. Additionally, or alternatively, content item memory 206 may be removable memory such as, for example, a flash media card. The memory 204 and content item memory 206 are representative of computer-readable storage that may be implemented as volatile and/or non-volatile memory.

Memory 204 may contain a database module 208, a location module 210, a recommendation module 212, a tagging module 214, a user interface generation module 216, and/or additional modules not shown. The database module 208 may be configured to communicate with the database 112 and/or the database module 118 in the server 110. The location module 210 may be configured to receive an indication of the device's location 106 and correlate that location with a content item currently being consumed on the device 104. The recommendation module 212 may be configured to recommend a content item, or portion thereof, to the user 102 of the device 104 based at least in part upon the location of the device 104. The tagging module 214 may be configured to associate tags with content items or portions thereof. For example, a tag could be a specific location indicating that a particular content item is associated with that location (e.g., a guidebook associated with the Eiffel Tower). The tagging module 214 may also associate different types of information such as recommendations with a content item. The tags may be reported by the tagging module 214 to the database 112 for storage in association with various content items. In some implementations, the database module 208 may facilitate the transfer of tag data from the device 104 to the database 112. The user interface generation module 216 may comprise instructions that configure the device 104 to generate a user interface which is configured to provide the user with controls and menus suitable to access the content items and manually placed tags as will be discussed in more detail below relative to FIGS. 9 and 10.

Content items 220(1)-220(N) may be stored in the content item memory 206 (as shown) or otherwise accessed by the device 104 for consumption. For example, an electronic book reader may render pages of an electronic book on the display for viewing, or an electronic player device may play audible sounds from a music track for listening. For example, content item 220(1) may be a guide book about Paris, France that has multiple portions 222 (e.g., chapters, pages, and the like) and multiple tags 224 (e.g., page 130 is related to the Eiffel Tower). Another content item 220(N) may be an audio book divided into chapters similar to the tracks on a compact disc (e.g., portions 226) with tags 228 associated with one or more of the chapters (e.g., chapter 3 may discuss an event that happens in downtown Paris within sight of the Eiffel Tower and therefore have a location tag associated with the location of the Eiffel Tower).

The device 104 further includes a set of input/output devices 230. These input/output devices include one or more display devices 232 to present content items visually to the user, and optionally act as an input where a touch-sensitive display is used and an accelerometer 234 to generate orientation and relative motion input. For example, the accelerometer 234 may be used to determine orientation of the device 104 during consumption of a content item. The device 104 may also include an antenna 236 for wireless communication such as with the network 108 and/or the server 110. Other input/output devices 238 which may include a keyboard, a joystick, a mouse, control key, and ambient light level sensor, a barometric pressure sensor, a thermometer, a biometric reader, an altimeter, etc may also be present.

Other modules in the device 104 may include a real-time calendar/clock 240 to provide date and time. This calendar/clock 240 may be used to compute a date and time when a content item is accessed, or how long a user accesses a portion of the content item. This information may be stored in a tag 224 or 228 and interpreted to indicate that, for example, a particular content item or portion thereof is more relevant at certain times of day or times of year.

Additionally, the device 104 may include a global positioning system (GPS) 242 to enable determination of location, velocity, altitude, and such. The GPS 242 may be used to generate location tags that can be associated with content items to help determine where those content items are accessed. For instance, such location-based tags may suggest that users are more likely to consume content items when they are located in, or near, a particular place such as in the sample above regarding guidebook content that is accessed at or near the Eiffel Tower.

The device 104 may include a network interface 244 to facilitate a local wired or wireless communication connection to the network 108. In some implementations, the network interface 244 may provide location information by, for example, inferring device location based on an Internet protocol address of a wireless access point or deriving a location such as by calculating time delay between radio sites, or the like. The network interface 244 may be configured to manage handshaking and related data routing aspects of network communication whereas the antenna 236 may be configured to receive and transmit wireless signals that carry data specified by the network interface 244.

Illustrative Database and Content Item

Figure 3:
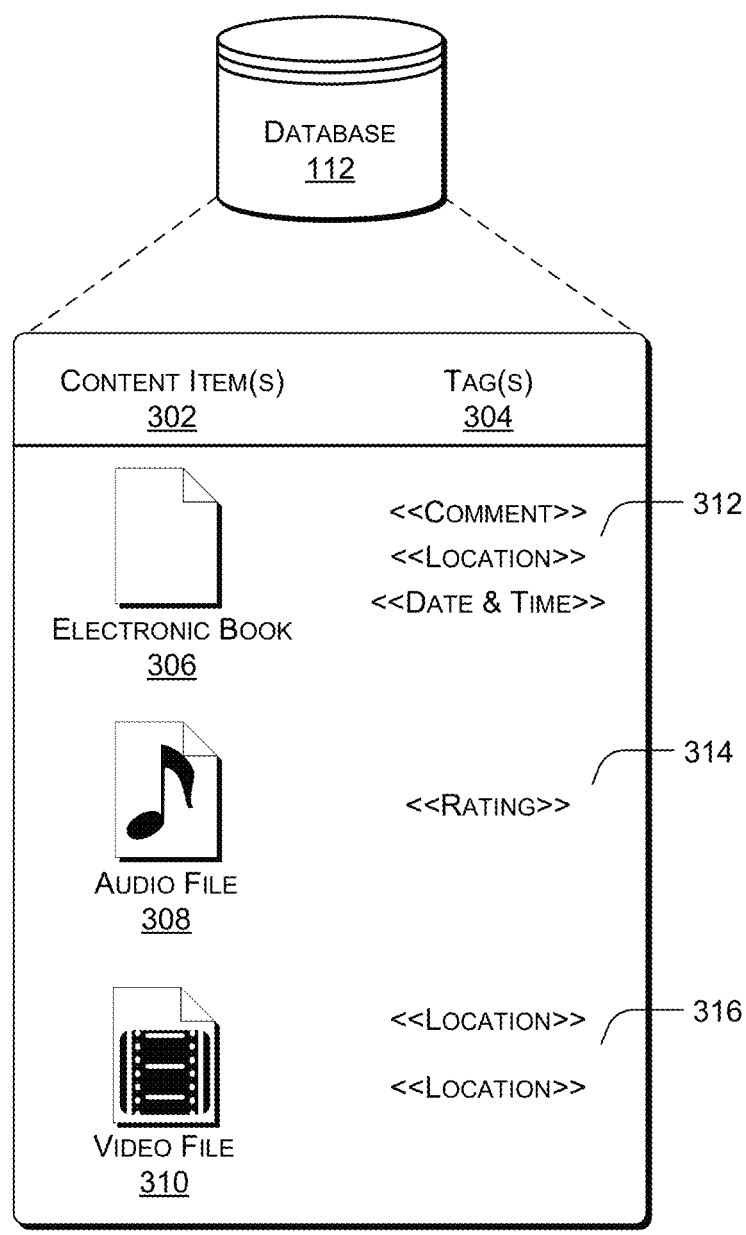
FIG. 3 shows the illustrative content database of FIG. 1 that stores content items accessed by the devices.

FIG. 3 shows the database 112 of content items from FIG. 1 in greater detail. The database 112 may contain multiple content items 302 and tags 304 associated with those content items 302. The database 112 may include essentially any information pertaining to content items 302 that a user may wish to access and consume. Illustrative content items 302 include an electronic book 306, an audio file 308 (e.g., a song, an audio book, and the like), and a video file 310. Each of the respective content items 302 in the database 112 may have an identifier such as title, identification number, invariant reference number, and so forth.

Any of the content items 302 may be associated with one or more tags 304. For example, the electronic book 306 may be associated with three tags 312. One of the tags associated with the electronic book 306 may be a comment that a reader chose to associate with that particular content item. The comment may be something the reader wishes to share with other readers of that same electronic book 306. For example, in the context of a travel guidebook, a user may comment that the entry fee to the Eiffel Tower has increased since the travel guidebook was written. This type of comment may provide value to other users of the travel guidebook because it corrects outdated information and allows users to share experiences.

Another type of tag 312 associated with the electronic book 306 may be a location tag. The location tag may indicate a spatial location that is related to the electronic book 306. For example, the book "Famous Sights of Paris" would be associated with the location of Paris, France, the Eiffel Tower, and so forth. Another tag 312 associated with electronic book 306 may be a date and time tag. Returning again to the example of a travel guidebook, the date and time tag may be associated with a date and/or time at which content in that travel guidebook is relevant. For example, directions to and a brief summary of a café would be relevant during the hours in which the café is open. Similarly, information about the rose gardens of Paris may be more relevant in May and less relevant in January. The date and time tag may contain this type of information.

Similarly, the audio file 308 may be associated with a rating tag 314. The rating tag may be an indication of ranking, relevance, quality, or other subjective evaluation that a user wishes to associate with the audio file 308. In some implementations, ratings—particularly numeric ratings—from multiple users may be aggregated by the server 110 and averaged to provide an average rating that is presented to users that are consuming or may consume the audio file 308.

A further content item 302 may comprise a video file 310 that is associated in the database 112 with two location tags 316. The video file 310 may contain recordings of two different locations and therefore it may be associated with two separate location tags 316. For example, the video file 310 may be a video of a walking tour of Paris, France that covers of the Eiffel Tower and the Arc de Triomphe and have location tags for both of these sites.

Figure 4:
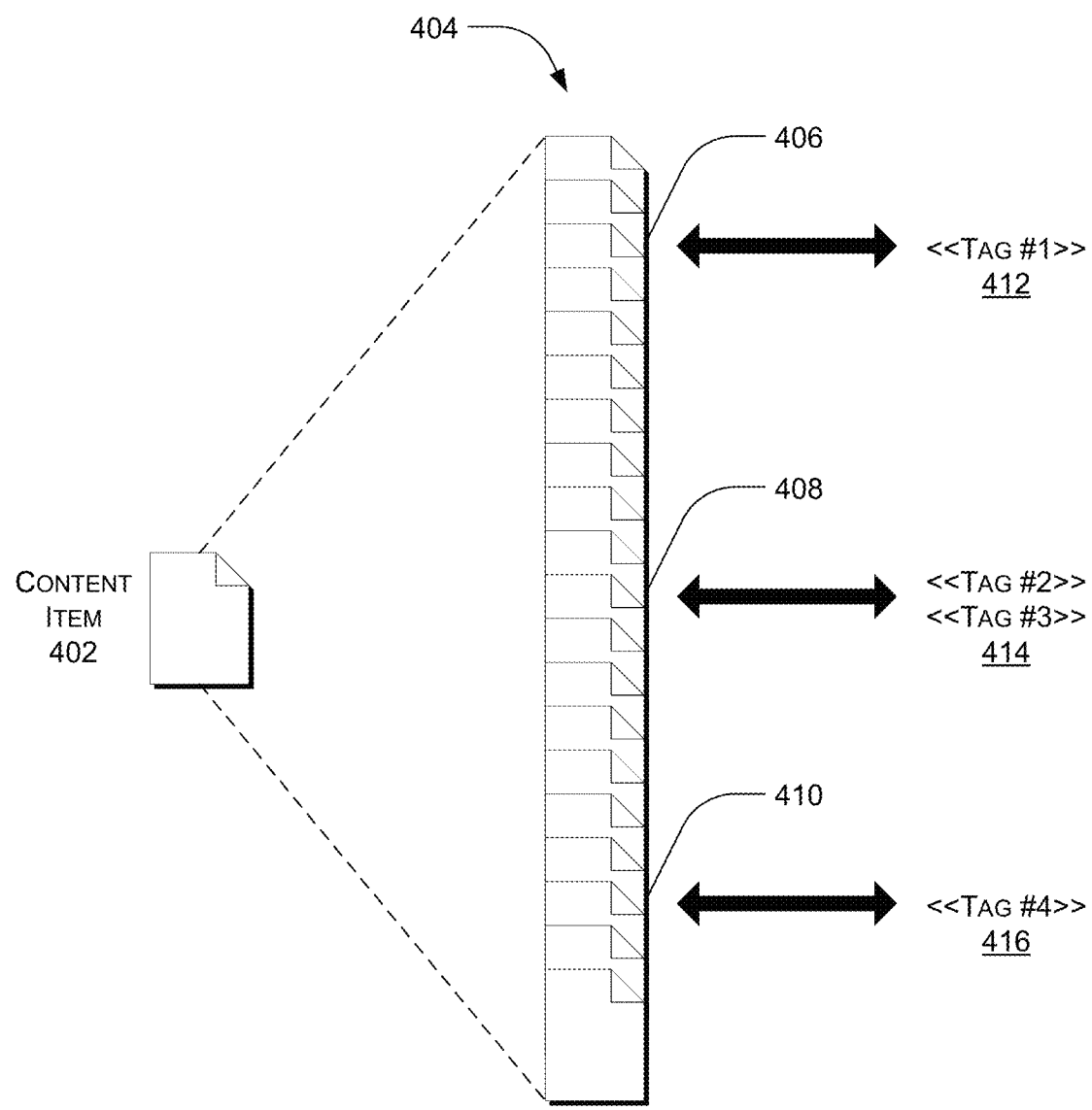
FIG. 4 shows an illustrative content item with respect to portions of the content item associated with multiple tags.

FIG. 4 shows a representative content item 402 divided into multiple portions 404. The content item 402 may be the same or similar to a content item 220 stored in the device 104 or a content item 302 stored in the database 112. When the content item 402 is an electronic book, the portions 404 of the content item may comprise a word, a paragraph, a page, a chapter, a section, or the like. When the content item 402 is an audio file, the portions 404 of the content item may comprise a song, an album, a chapter, a multi-second interval, or the like. When the content item 402 is a video file, the portions 404 of the content item may comprise an episode, a chapter, a frame, a multi-second interval, or the like.

The content item 402 may have several portions which are not tagged and, in this example, three portions 406, 408, and 410 that are each associated with one or more tags. Continuing with the example of a travel guidebook, portion 406 may be a page from the travel guidebook that discusses the Paris Charles de Gaulle Airport and is tagged 412 with the location of the airport. A second portion 408 of the travel guidebook may discuss the Hotel Paris Hilton and be associated with two tags 414, one tag for the location of the hotel, and another tag indicating a user rating of that hotel. A fourth tag 416 may be associated with the third portion 410 of the content item 402. This fourth tag 416 may be the same tag as the first tag 412 but associated with a different portion of the content item. For example, this portion 410 may be a map of the Paris Charles de Gaulle Airport which, like portion 406 describing the airport, is also tagged with the location of the airport. Thus, one portion of a content item 402 may be associated with multiple tags and the same tag may be associated with multiple portions of the content item 402.

Illustrative Recommendation and Filtering

The recommendation modules 122 or 212 from the server 110 in FIG. 1 and the device 104 in FIG. 2 may both function independently or in conjunction with one another to provide recommendations of content items to a user of an electronic access device 104. The recommendation module 122/212 in one implementation includes an aggregation module 502 and a filtering module 504. Other techniques for filtering content items and/or identifying recommended content items are discussed in U.S. Pat. Nos. 7,376,588 and 6,912,505, which are both incorporated herein by reference in their entirety.

The aggregation module 502 may be configured to identify content items that are accessible by the device 104. This may include content items stored locally on the device 506 such as content items stored in the content item memory 206. Additionally, the aggregation module 502 may draw from other content items 508 available from remote sources such as the content items 302 stored in the database 112. The availability of other content item 508 may depend upon factors such as the existence of a network connection, a subscription to sources of premium content items, and any other factor that can affect access to remote content. The aggregation module 502 may be thought of as assembling a pool of content items from which recommendations may be made.

The filtering module 504 may be configured for reducing the pool of content items identified by the aggregation module 502 in order to arrive at a recommendation of one or more content items. User preferences 510 may be one factor considered by the filtering module 504 when filtering content items. For example, a user may wish to consume only content items that are tagged with the user's current location. Similarly, the user may only be interested in content items of a particular genre or by a particular author. Additionally, the filtering module 504 may filter based on other factors, such as user ratings 512. The user ratings 512 may be tags associated with a content item which indicate a rating of that content item based on feedback received from other users who have accessed that content item. For example, the user may indicate, such as through user preferences 510, that he or she only wishes to receive recommendations for content items that received four or five stars (five stars being the highest rating). Alternatively, the filtering module 504 may automatically remove the lowest rated content items (e.g., content items in the lowest decile of ratings) so that these content items are not presented to the user as recommendations.

Content items may also be filtered based on access histories of similar users 514. The user receiving a recommendation may be identified as "similar" to other users based on users exhibiting similar behaviors, or on users with similar characteristics in their user profiles. For example, should the user be a professional art historian, the user might receive recommendations based on content access histories other users with similar professional specialties, such as artists or university professors. Additionally or alternatively, a purchase history indicating an interest in fine art may be used to identify other people, who have a similar purchase history and provide recommendations based upon the access history of those users with the similar purchase history (perhaps even filtered for those items that the user receiving the recommendation has not yet viewed or purchased). The access history of similar users 514 may further consider the location at which a content item was accessed by the other users that are identified as similar to the user receiving a recommendation. For example, an art historian near the Eiffel Tower may receive recommendations for content items that other art historians accessed while near the Eiffel Tower.

The real-time information available from multiple content access devices, particularly devices all sharing information with the server 110, and allows for not just "backwards looking" consideration of access or purchase histories but also real-time analysis of other devices. Thus, another factor which may be considered by the filtering module 504 is a frequency at which a given content item is available on other electronic access devices near the location of the device that will receive the recommendation 516. This may be thought of generally as a metric for how "popular" a content item is with other users in the same place at the same time. Obtaining this information may require that users allow the identity of content items stored on their respective devices to be exposed at least for this purpose. For example, if a tourist approaching the Eiffel Tower with an electronic access device wishes to download a travel guide, he or she may ask for a recommendation based on travel guides that other users in that location currently have loaded onto their respective devices. Conversely, if that tourist later wants to locate a restaurant, but avoid going to places where other tourists may be, he or she may request a recommendation that meets all of the other filtering criteria and is not found, or found only infrequently, on the devices of other users in close proximity to his or her location.

This real-time data may be stored and used as historical data to represent what other users have stored on electronic access devices, not just at a given moment but also over a period of time. This historical "popularity" information can provide a broader set of data from which to derive recommendations. This information may also provide a more representative view of location-relevant data in some circumstances. For instance, when surrounded by a group of schoolchildren carrying access devices, a real-time analysis of nearby content access devices may refrain from recommending content of interest to an adult.

Another possible approach for recommending content items is to anticipate where a user is likely to go next from a current location. The recommendation module 122/212 may obtain past location information from the location module 210 and based on that calculate where the user will go next. Additionally, the recommendation module 122/212 may analyze, in aggregate, where users who have accessed content items at one location tend to access content items at the next location. This information may be captured, for example, using a stochastic process, such as a Markov chain. For example, if users that access a content item at the Eiffel Tower frequently access another content item later at Notre Dame the recommendation module 122/212 may recommend content items tagged with the Notre Dame location. This predictive information about future movements of the user can be used to recommend content items that will be relevant in the future. For example, the user could review these recommended content also, items while on a bus or train en route to another location.

Illustrative Processes

Figure 6:
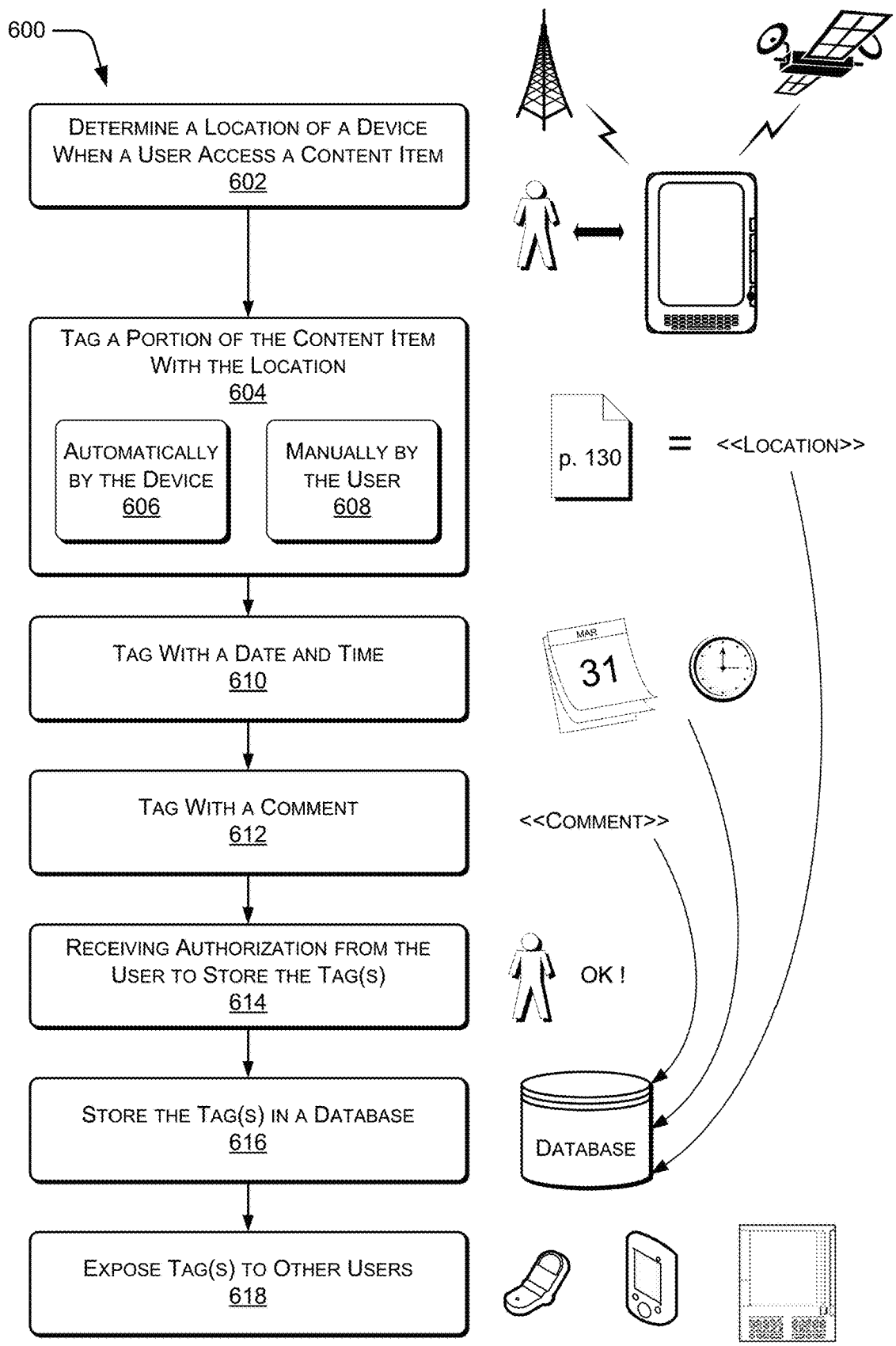
FIG. 6 is a flow diagram of an illustrative process for associating a tag with a portion of a content item based on a location of a device when the content item is accessed.

FIG. 6 shows an illustrative process 600 of tagging a content item; the process 600 may, but need not, be implemented using the architecture shown in FIG. 1. The processes discussed in this disclosure are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

At 602, a location of an electronic access device is determined when a user of the device accesses a content item or a portion of a content item. The location of the device can be used as a proxy for the location of the user, revealing where a person is when he or she reads, listens, watches, etc. a content item. As described above with respect to FIG. 2, location may be determined by several mechanisms, including receiving location information from a positioning system such as GPS, querying a network service over which the device communicates to determine a location, inferring the location based on networking information from the device, querying the user and receiving input of the location from the user, and the like. For example, the device may detect that page 130 of a guidebook is displayed and that the device is located at latitude 48° 51' 32 North, longitude 002° 17' 45 East (i.e., the latitude and longitude of the Eiffel Tower).

At 604, a portion of the content item is tagged with the location. This tagging forms an association between a portion of the content item, or an entire content item, and a location. The tagging may be performed by the tagging module 214 discussed above in FIG. 2. There are many different ways to implement tags on content items. For instance, the format of a content item may include a mechanism for tagging such as a textual document that is encoded in extensible markup language format may be tagged with XML tags. In other implementations, metadata associated with the content item may be modified to represent a tag or an additional file containing the tag may be linked to the content item. In some implementations, the tagging is performed automatically by the device 606. In this implementation, when a content item is accessed, the current location of the device is tagged onto the content item. In other implementations, the user manually tags the content item, or portion, with the location 608. By manually tagging, the user may control when tags are generated and the user may tag a content item with a location other than the actual location of the device. Manual tagging may also be implemented in situations when the device is unable to automatically detect its location.

At 610, the content item may be additionally tagged with a date and time of when the content item was accessed. Date and time data may subsequently be analyzed, for example by the recommendation module 122/212 to reveal temporal patterns of content item access. For example, a certain song may be accessed much more frequently at nighttime than during the daytime.

At 612, the content item, or a portion thereof, may be tagged with a comment from the user. This comment may include any type of information the user wishes to associate with the content item. In some circumstances it may be notes or a personal reminder that are not intended to be shared with others. In other cases, the user may wish to contribute something analogous to a review or a correction.

At 614, authorization is received from the user to store the tags in a database. The database may be the same as the database 112 in FIGS. 1 and 3. If, due to privacy concerns or other reasons, the user elects not to store the tags in the database, the tags may still be stored locally on the device such as the tags 224 and 228 shown above in FIG. 2. Local storage may be appropriate for tags that the user does not intend to share with a larger community of device users.

At 616, after receiving authorization from the user, the tags are stored in the database in association with the content item. Each content item may be associated with several tags and each tag may be associated with multiple portions of the same content item as well as multiple different content items. Although relative few numbers of tags are illustrated in this disclosure, some content items (e.g., a large and popular travel guidebook) may come to be associated with hundreds of thousands of tags. Storing the tags may be implemented by wirelessly transmitting the tag from the device to a database or to a network coupled to the database. The transmission may include an identifier for the content item (e.g., title, international standard book number, or the like) so that the tag is associated with the correct content item in the database.

At 618, the tags are exposed to other users. This exposure may involve indirect exposure such as by providing the tags to the recommendation module 122/212 for use in identifying one or more content items to recommend to the user. Alternatively, the exposure may include direct exposure such as by making the tags in the database searchable and/or allowing a user to see the tags associated with a content item for example in response to a "show tags" command Even though a content item may remain fixed and unchanging (although updates or new versions may change the content item somewhat) the tags associated with a content item may be constantly changing as many different users interact with the content item and more and more tags are associated with that content item. Users who have already purchased or downloaded the content item to their devices would effectively have an evolving content item because access to the database will provide access to a growing set of tags for that content item.

Figure 7:
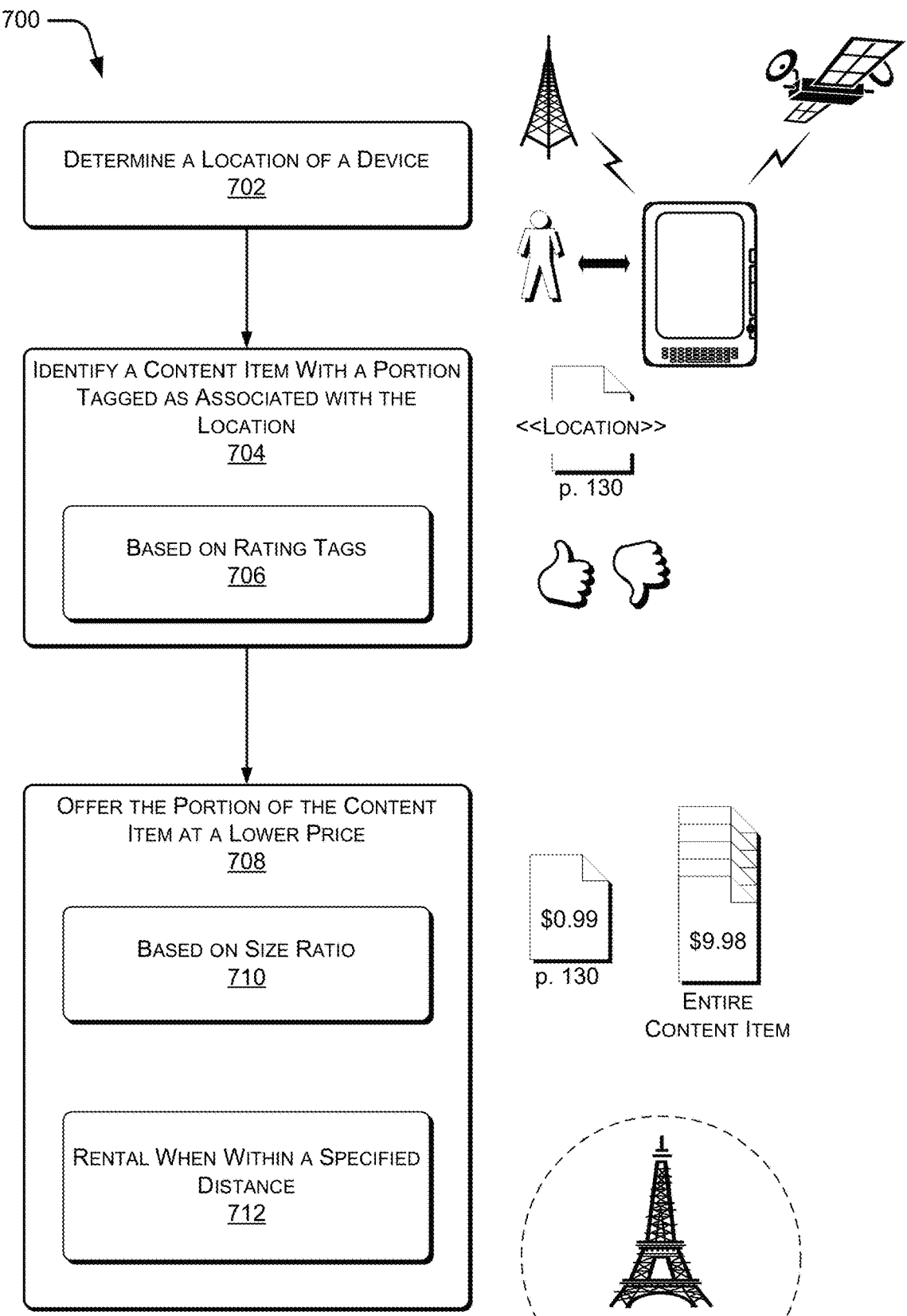
FIG. 7 is a flow diagram of an illustrative process for offering a location-relevant portion of a content item at a lower price than the entire content item.

FIG. 7 shows an illustrative process 700 for offering a location-relevant portion of a content item at a lower price than the entire content item. The process 700 may, but need not, be implemented using the architecture shown in FIG. 1.

At 702, a location of an electronic access device is determined. This determination may be made based upon any of the techniques discussed previously.

At 704, a content item having a portion tagged as being associated with the location is identified. Generally, the content item may be located either within the content item memory 206 of the device or elsewhere such as on the network 108 or in the database 112. For the purposes of marketing or selling content items, the recommended content item may be limited to content items that are not available on the device. Being available on the device is not limited to items stored on local memory but may also include availability on a network drive or account in the "cloud" from which the user of the device may freely access or download the content item. As discussed above, a content item may be tagged as being associated with a location when users access that content item from their devices while at that location. This may, depending on the user preferences and other factors, be implemented as a type of automatic tagging. Additionally, tags may be associated with a content item by a publisher or author of the content item. For example, the publisher of a travel guidebook to France may tag the entire guidebook with the location tag of France. Location tags may also be associated with a content item based at least in part on keywords in the content item that are related to the location. The technique for tagging content items based on keywords will be discussed in greater detail in FIG. 8.

At 706, the identifying content items may include finding content items based at least in part on rating tags associated with the content items. For example, of all the content items that are tagged as associated with a location, only those that have a relatively high rating will be identified. In a sales or advertising context, using ratings to further filter of the content items increases the probability that the user will ultimately receive content item with which he or she is satisfied.

At 708, a portion of the content item is offered to the user at a lower price than the entire content item. The granularity provided by tags associated not just with entire content items but with portions within a content item provides a very fine level of detail regarding which specific pages, chapters, and such will be of interest to a given user in a given place and at a given time. By coupling this knowledge with an ability to sell limited access to a content item highly tailored and very compelling commerce scenarios become possible.

For example, at 710, a price of a portion of the content item may be based upon a size ratio of the portion to the size of the entire content item. If a user is at the Eifel Tower and he or she is interested in reading a guidebook about the Eifel Tower, he or she may wish to purchase only the portions of that guidebook that are tagged as associated with the Eifel Tower. So instead to paying $9.98 for the entire guide book it may be possible to purchase only a portion of the guide book for a lesser price such as $0.99.

Additionally, at 712, the lower price may pay for rental of the content item when the electronic access device is within a specified distance of the location. This implementation ties the location awareness of the device with both the tags associated with content items and the payment for use of those content items. For example, a user could purchase a guidebook specifically about the Eifel Tower for $7.99 or rent that guidebook for $0.99 only when at the Eifel Tower. The guidebook may be downloaded to the device and unlocked or otherwise made available to the user only when the device is in 500 meters of the Eifel Tower. This location-based rental is described in the context of a travel guidebook, but it is equally applicable for any content items tagged with a location.

Figure 8:
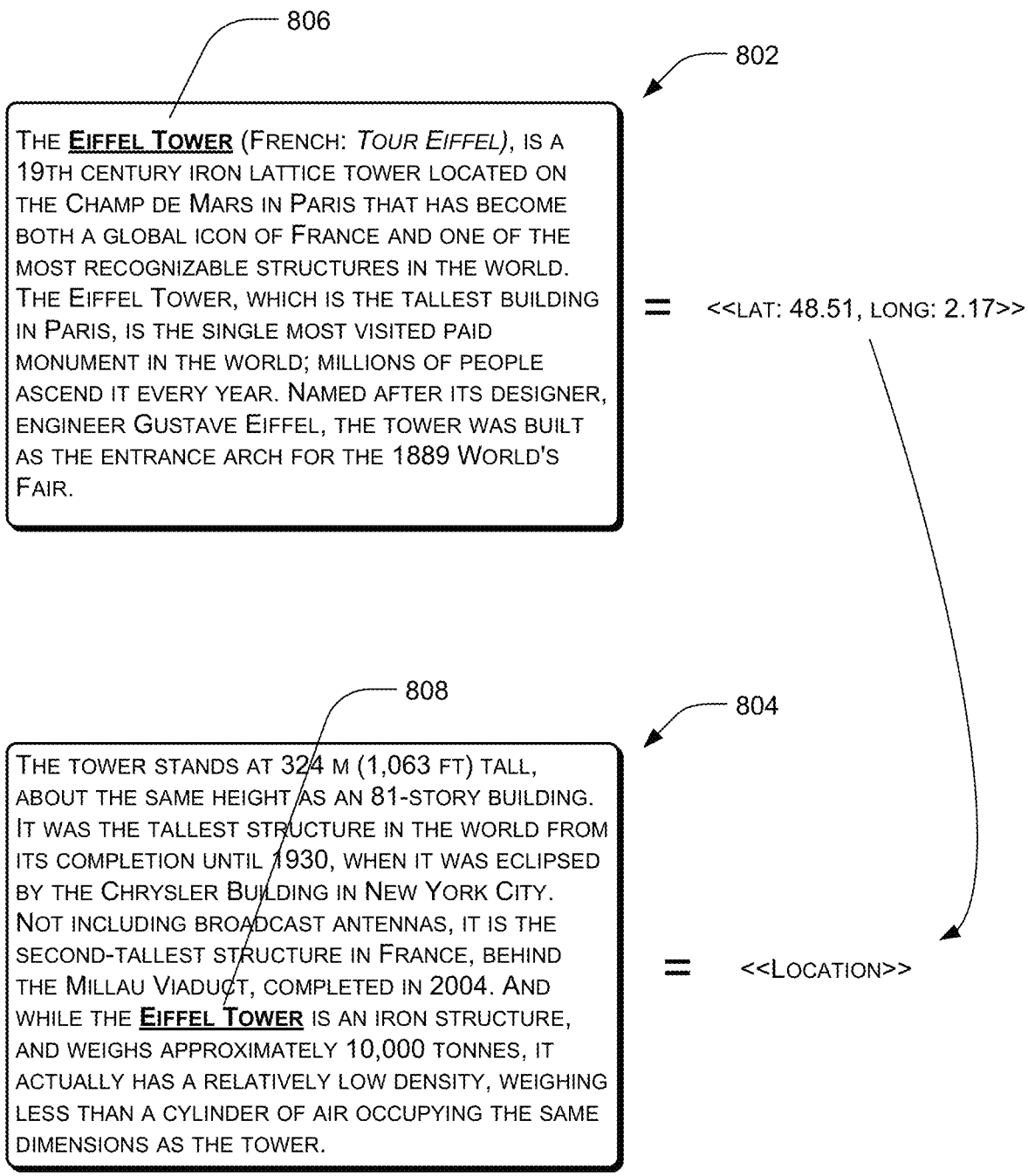
FIG. 8 shows illustrative portions of content items and association of a location tag with a content item based on keywords.

FIG. 8 shows illustrative portions of a content item and tagging with a location tag based on keywords as discussed above in FIG. 6. Tagging of a content item with a location tag based on keywords may be implemented as a type of automatic tagging by the content access device such as described above in operation 606 of FIG. 6. Although described herein within the context of textual content items (e.g., electronic books) "keywords" also include words identified from audio content items such as by speech analysis or words contained in video content items which are recognized by techniques such as image analysis.

A first portion of a content item 802 may be tagged with a location (e.g., a latitude and longitude). The location tag may be associated with the content item 802 automatically, manually, or by any of the techniques discussed above. The content item 802 also contains one or more keywords 806 (e.g., Eiffel Tower). In some implementations, keywords may be identified as such, for example by a publisher or author explicitly marking certain words or phrases as keywords. In other implementations, keywords may be identified automatically by techniques such as identifying infrequent words (e.g., filtering out very common words such as "the", "a", "is", and the like), identifying words or phrases that appear frequently within the content item 806, identifying proper names, as well as many other possible techniques.

A second portion of a content item 804, which may be a different portion of the same content item or a portion of a different content item, may also contain the same keyword 808 (e.g., Eiffel Tower). However, the second content item portion 804 is not associated with a location tag. By recognizing that the same keyword 806 and 808 appears in both content item portions 802 and 804 it is possible to automatically associate the location tag from the first content item portion 802 with the second content item portion 804. In some implementations, this association may be made by the tagging module 214 described in FIG. 2. Using keywords in this manner leverages the content tags that have been associated with content items so that a greater number of content items, or content item portions, can be readily associated with appropriate location tags.

Illustrative User Interfaces

Figure 9:
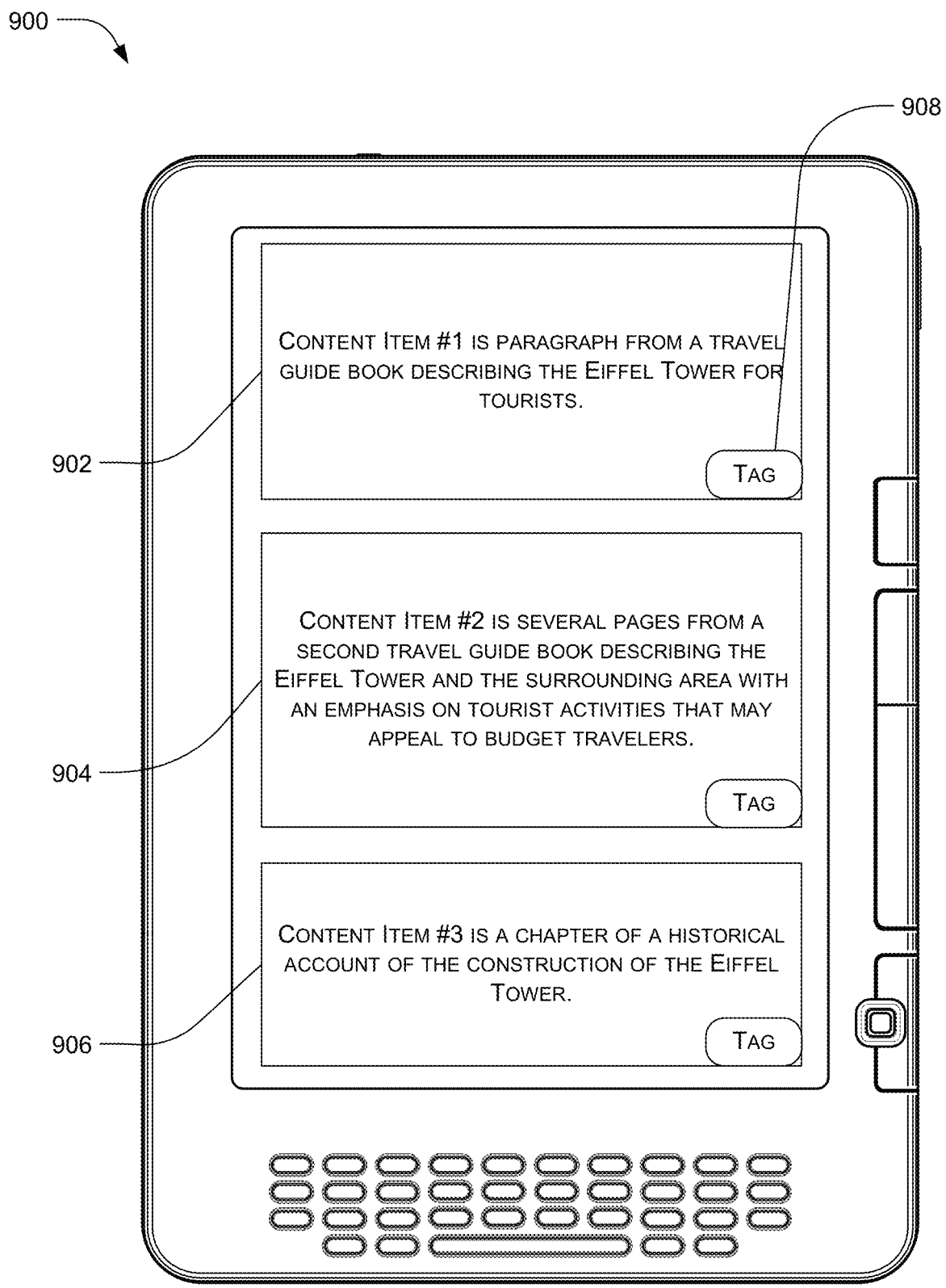
FIG. 9 shows an illustrative user interface of an electronic book reader device displaying three separate portions of content items.
Figure 10:
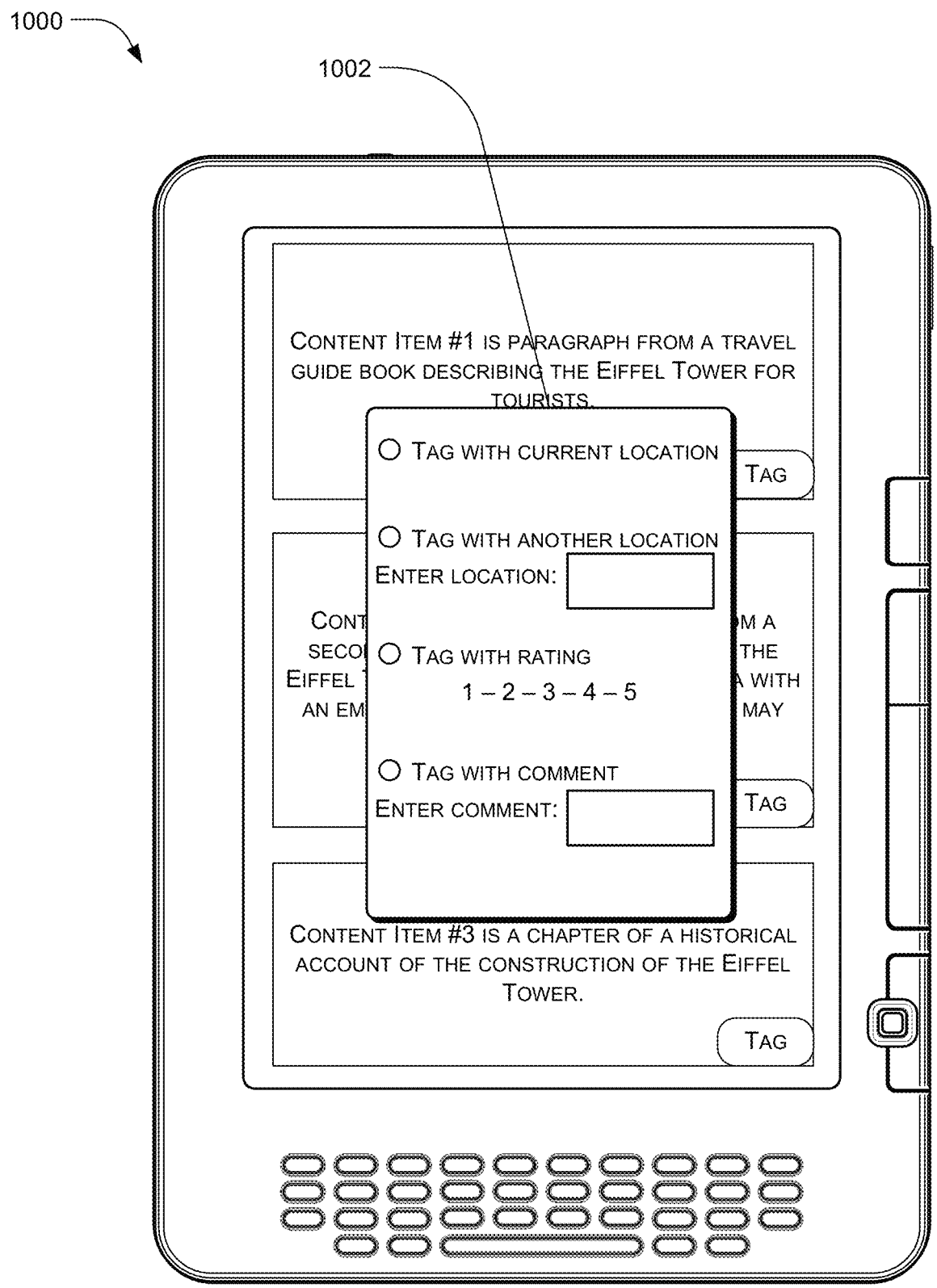
FIG. 10 shows the illustrative user interface of FIG. 9 with a window for manually associating a tag with one of the displayed portions of the content items.

FIGS. 9 and 10 shows illustrative user interfaces 900 and 1000 of an electronic book reader device which is configured to display portions of multiple content items and associate tags with those content items. The electronic book reader device may be the same or similar to the device of FIG. 2. Although shown as an electronic book reader device in FIGS. 9 and 10, other electronic access devices may also display multiple content items based on location.

FIG. 9 shows in illustrative user interface 900 including three content items 902, 904, and 906 that occupy the top, middle, and bottom portions of a display of the electronic book reader device. Of course, a greater or fewer number of content items may be displayed simultaneously depending on things such as display dimensions, font size, the size of a portion displayed, and the like. In some implementations, this user interface may be generated automatically by the electronic book reader device such as, for example, when the device becomes aware of its current location. The multiple content items 902, 904, and 906 may be recommended content items 518 such as discussed in FIG. 5.

The multiple content items 902, 904, and 906 displayed on the device may be content items stored locally in the content item memory 206 of the device, content items available remotely such as from the database 112, or any combination of local and remote content items. By limiting the displayed content items to only those content items that are locally available on the device, a user may be able to see what content items he or she already has that are relevant to his or her location. For example, if the user is near the Eiffel Tower, this user interface 900 may bring together portions of multiple content items that each relate to the Eiffel Tower so that the user can quickly see location-relevant content from a number of sources without having to search through his or her library of content items.

Out of a pool of content items available from the content item memory 206, the database 112, and other sources, the displayed content items may be selected by filtering multiple content items each tagged with a location tag corresponding to the current location of the device. The creation of the pool of content items to potentially display on the device and the filtering of content items based on location tags may be performed by the aggregation module 502 and the filtering module 504, respectively, of FIG. 5. The filtering may also be based at least in part on user preferences 510, user ratings 512, and/or access histories of similar users 514 as described in FIG. 5.

The user interface 900 may also include a tag marker 908 for the user to associate a tag with the portion of a content item 902. This tag may be implemented using any number of user input techniques, but shown here as a soft button on a touch-sensitive display. Activating the tag marker 908 may allow the user to manually tag the displayed portion of the content item such as discussed above in operation 608 of FIG. 6. Manually tagging of portions of content items is also discussed in greater detail below in FIG. 10.

FIG. 10 shows a subsequent user interface 1000 that includes a pop-up window 1002 generated in response to activating the tag marker 908. Although shown here as a pop-up window 1002, the user interface 1000 may take any form that enables a user to manually tag a portion of a content item. The types of tags which a user may manually associate with a portion of a content item include location tags, ratings tags, comments, and the like.

Although the device may itself automatically tag a portion of a content item with a current location of the device, there may be situations in which the user wishes to manually tag a portion of a content item with the user's, and also the device's, current location. For example, the user may begin viewing a page of a tourist guidebook that discusses the Eiffel Tower, but then begin browsing other portions of the guidebook. A different page of the guidebook may mention the Eiffel Tower or other content that the user recognizes as related to the Eiffel Tower (e.g., for example context may make it clear to a human reader that this portion of the guidebook is related to the Eiffel Tower, but if that portion lacks specific keywords a computer may not be able to automatically assign a tag) and the user knowing that he or she is currently near the Eiffel Tower may choose to manually tag this portion with the current location of the device.

Additionally, for reasons unique to a particular user that user may wish to associate a portion of a content item with a current location of the device. For example, the user may be listening to a song on an electronic access device while visiting Paris and because the user now thinks of that song in connection with Paris, although there may be no objective connection between the song and Paris, the user can manually associate the song with the current location of the device.

In some situations, the user may wish to tag a portion of a content item with a location other than his or her current location. The user interface 1000 may provide a field for the user to enter a user-specified location that will be tagged to the portion of the content item. The field may be an empty box into which the user inputs a location such as by typing, it may be a drop-down menu from which the user selects a location, it may also be a map on which the user can indicate a location, or the like. For example, the user may wish to prepare for a future trip and review multiple content items, such as travel guidebooks, that he or she anticipates using at various places throughout the trip. In order to have these content items and specific portions within the content items readily available when the user arrives at the various places on his or her itinerary, the user may wish to "pre-tag" these portions of content items with location tags while still at his or her home.

Additionally, the user may tag a portion of a content item with a user rating. In this example the rating may be from 1 to 5 with five being a highest rating. Other types of ratings such as a percentage from 0 to 100%, a thumbs-up or thumbs down, and the like are also possible. Similar to the way customer ratings are applied to products on retail websites, user ratings of content items may be exposed to users so that the users can choose a content item based on the rating. Additionally, the user ratings 512 may be provided to the filtering module 504 of FIG. 5 in order to recommend content items 518 to the user. When the ratings are numerical and follow a similar rating scheme (e.g. 1 to 5 stars, or the like) the ratings may be averaged to provide an aggregate or mean rating value.

Users may also tag a portion of the content item with a comment. The illustrative pop-up box 1002 shown here includes a field for the user to enter a comment. For example, the comment may be a correction based on the user's personal experiences, it may be a reference to another content item, a note or reminder related to the portion of the content item, and/or the like. The user may decide whether he or she wishes to upload the tags to the server 112 and share the tag content with other users. For comments, the user may wish to share some with other users of the same content item (e.g., this hotel no longer deserves a three star rating) or keep others private (e.g., the digital photos of the Eiffel Tower are stored in folder DCM1007).

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method comprising:
   under control of one or more computer systems configured with executable instructions,
   determining a location of an electronic device;
   identifying a content item having a portion tagged as being associated with the location, the portion of the content item not available on the electronic device and being less than an entirety of the content item; and
   responsive to the determining the location and the identifying the content item, generating an offer to provide access to the portion of the content item on the electronic device at a reduced price that is not free and that is lower than a price of the entirety of the content item, wherein the portion of the content item is authorized to be accessed when the electronic device is within a predetermined distance of the location.

2. The computer-implemented method of claim 1, wherein the portion of the content item tagged as being associated with the location is tagged at least partially in response to access of the portion of the content item by other electronic devices while the other electronic devices are at the location.

3. The computer-implemented method of claim 1, wherein the portion of the content item tagged as being associated with the location is tagged based at least in part on keywords in the portion of the content item that are related to the location.

4. The computer-implemented method of claim 3, wherein the content item comprises an audio file and the keywords are identified by speech analysis of the audio file.

5. The computer-implemented method of claim 1, wherein the portion of the content item tagged as being associated with the location is tagged by a publisher or an author of the content item.

6. The computer-implemented method of claim 1, wherein the portion of the content item is associated with a rating tag and the identifying the content item further comprises identifying the content item based at least in part on the rating tag.

7. The computer-implemented method of claim 1, wherein the reduced price is based at least in part on a ratio of a first size of the portion of the content item to a second size of the entirety of the content item.

8. The computer-implemented method of claim 1, wherein the reduced price is for rental of the content item, wherein the rental is limited to when the electronic device is within the predetermined distance of the location.

9. The computer-implemented method of claim 1, wherein the content item comprises an audio file and the portion of the content item comprises a song, an album, a chapter, or a multi-second interval.

10. The computer-implemented method of claim 1, wherein the content item comprises a video file and the portion of the content item comprises an episode, a chapter, a frame, or a multi-second interval.

11. A system configured to generate a user interface on an electronic device, the system comprising:
    one or more processors;
    one or more memories accessible by the one or more processors; and
    instructions stored in the one or more memories that, upon execution by the one or more processors, cause the system to:
    identify a plurality of potential content items each tagged with a location tag corresponding to a current location of the electronic device;
    identify a first content item and a second content item of the plurality of potential content items based at least in part on the first content item or the second content item being accessed by an additional electronic device located at the current location;
    generate a user interface including at least:
        a first region containing a first portion of the first content item that is tagged with a first location tag corresponding to the current location of the electronic device, wherein a second portion of the first content item is tagged with a first different location tag; and
        a second region containing a third portion of the second content item that is different from the first content item and that is tagged with a second location tag corresponding to the current location of the electronic device, wherein a fourth portion of the second content item is tagged with a second different location tag.

12. The system of claim 11, wherein the instructions further cause the system to generate the user interface automatically at least partially in response to determination of the current location of the electronic device.

13. The system of claim 11, wherein the first content item and the second content item are stored locally on the electronic device.

14. The system of claim 11, wherein the first content item and the second content item are in different languages.

15. The system of claim 11, wherein identifying the first content item and the second content item is further based on at least one of user preferences of a user associated with the electronic device, user ratings, or access histories of other users similar to the user associated with the electronic device.

16. The system of claim 11, wherein the first region and second region of the user interface comprise different frames or windows of the user interface.

17. The system of claim 11, wherein the user interface further includes a tag marker that upon activation by a signal from an input device associates a tag with a portion of the first content item or the second content item presented in the user interface.

18. The system of claim 17, wherein the tag comprises a user-specified location.

19. The system of claim 17, wherein the tag comprises a user rating.

20. The system of claim 11, wherein the first content item comprises a first electronic book, the first portion of the first content item comprises a first page of the first electronic book, the second content item comprises a second electronic book, and the third portion of the second content item comprises a second page of the second electronic book.

* * * * *